Patented Dec. 19, 1944

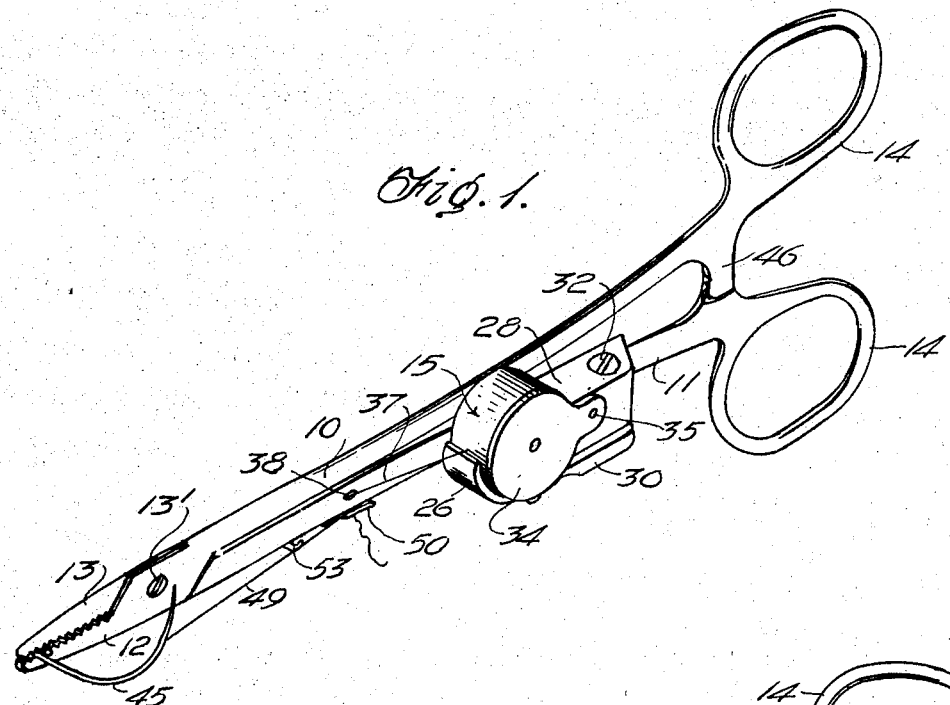
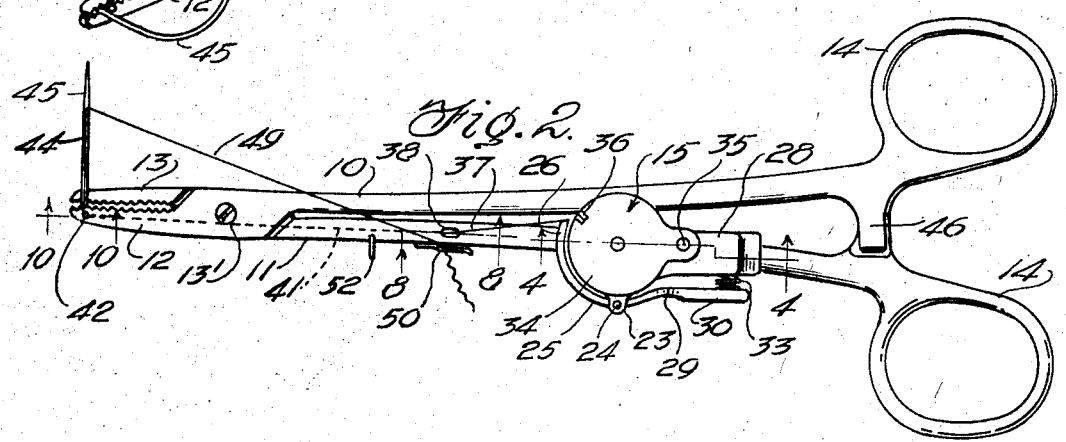
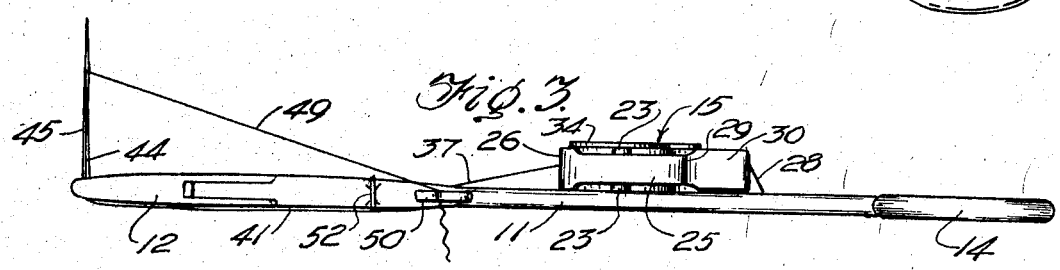

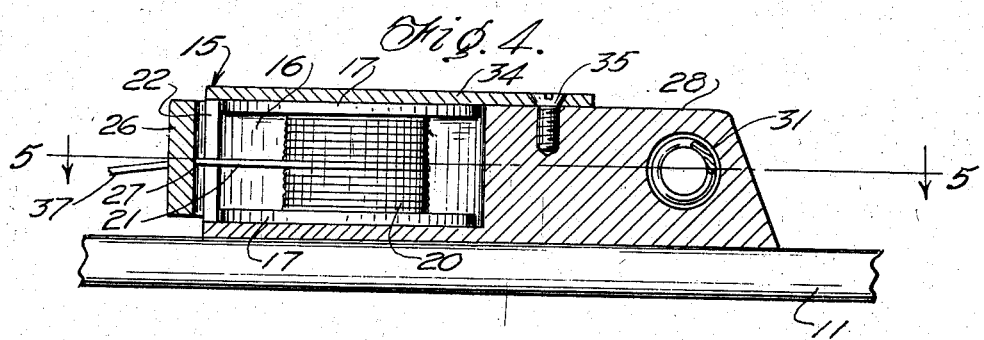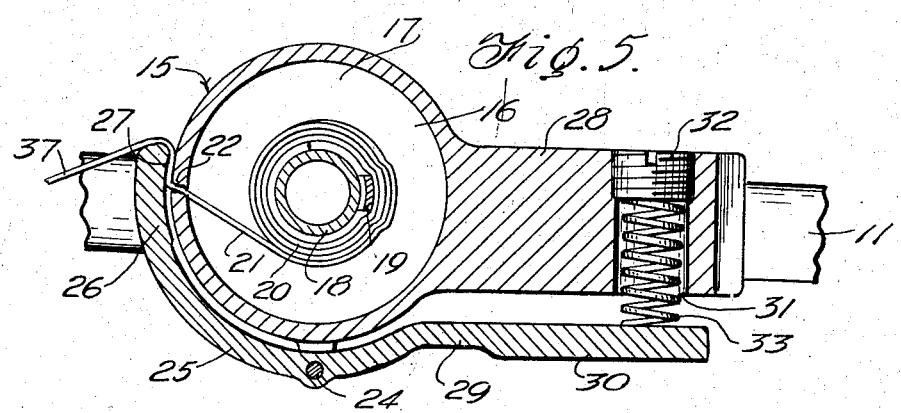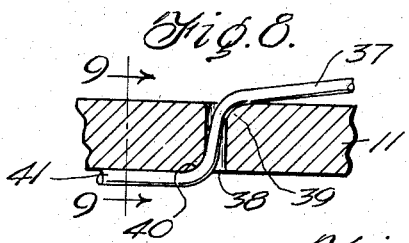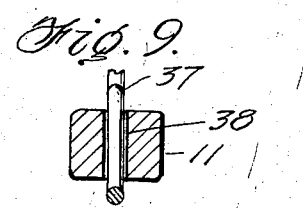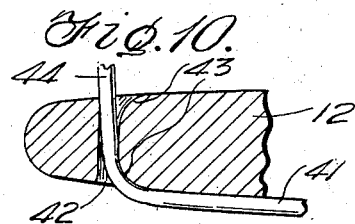

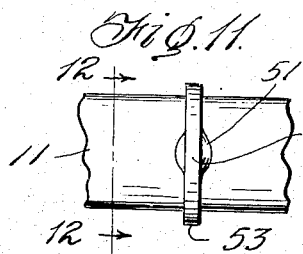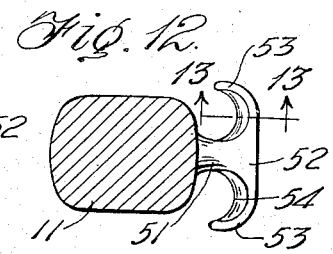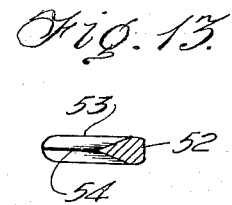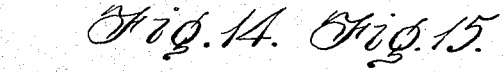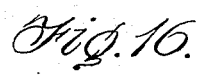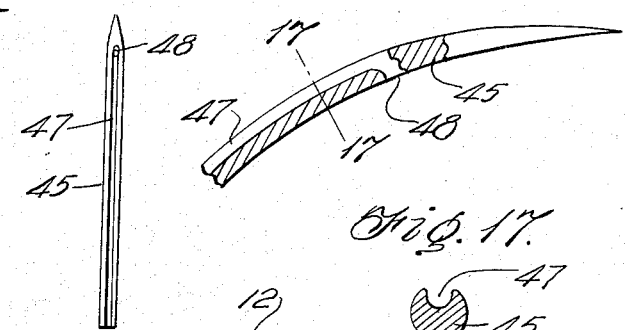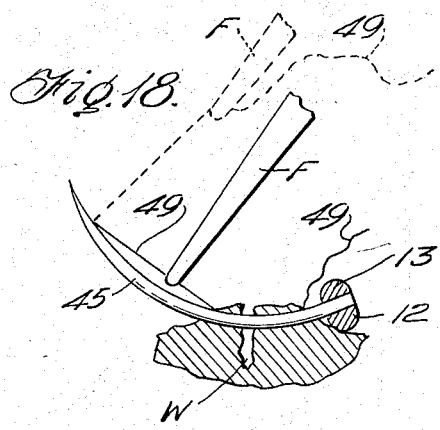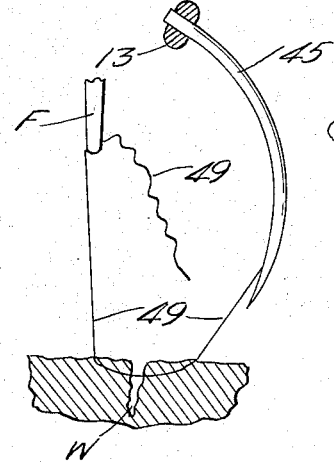

REISSUED

MAR 25 1947

2,365,647

UNITED STATES PATENT OFFICE 2,365,647

SUTURING INSTRUMENT

Herbert H. Ogburn, Greensboro, N. C., assignor of one-half to Bobbie Gene Ogburn, one-fourth to Jean Ogburn, and one-fourth to Sally Ogburn, all of Greensboro, N. C.

Application December 20, 1943, Serial No. 514,946

10 Claims. (Cl. 128—340)

This invention relates to surgical instruments and has special reference to a suturing device.

One important object of the present invention is to provide a novel and improved suturing device wherewith suturing operations may be performed with great facility and rapidity.

A second important object of the invention is to provide a novel device of the character set forth wherein the operation of the instrument is, in substance, practically identical with that of an ordinary forceps for holding suturing needles so that a surgeon accustomed to use such forceps is not required, in using the present instrument, to acquire a new method of manipulation in forcing a needle through the lips of a wound.

A third important object of the invention is to provide a suturing device having novel means for carrying a bobbin of suturing material.

A fourth important object of the invention is to provide a device of the kind set forth having a novel arrangement of brake means whereby the suture is gripped in such manner as to avoid pull on the suture tending to unwind the bobbin.

A fifth important object of the invention is to provide guide means of such character as will cause the suture to lie closes to the body of the instrument and thereby greatly lessen the possibility of the needle being unthreaded.

A sixth important object of the invention is to provide a novel arrangement of cutting means for severing the suture after it has been applied to the wound.

A seventh important object of the invention is to provide novel means for gripping the suture end when the instrument is not in use and thereby preventing accidental unthreading of the needle.

With the above and other objects in mind, the invention consists in general of certain novel details of construction and combinations of parts hereinafter fully described, illustrated in the accompanying drawings and particularly pointed out in the appended claims.

In the accompanying drawings like characters of reference indicate like parts in the several views, and:

Figure 1 is a perspective view of the complete device.

Figure 2 is a plan view thereof.

Figure 3 is an edge view thereof.

Figure 4 is a greatly enlarged section on the line 4—4 of Figure 2.

Figure 5 is a section on the line 5—5 of Figure 4.

Figure 6 is a side elevation of the bobbin shown in Figure 4 with the suture removed and showing a clip used to hold the end of the suture at the start of a bobbin winding operation.

Figure 7 is a similar side elevation at right angles to Figure 6.

Figure 8 is a section on the line 8—8 of Figure 2, the scale being still further enlarged.

Figure 9 is a section on the line 9—9 of Figure 8.

Figure 10 is a section, to a greatly enlarged scale, on the line 10—10 of Figure 2.

Figure 11 is a greatly enlarged detail view of a portion of Figure 3 and showing the suture cutter used in this invention.

Figure 12 is a section on the line 12—12 of Figure 11.

Figure 13 is a section on the line 13—13 of Figure 12 but to a scale twice that of said figure.

Figure 14 is an enlarged side elevation of a curved needle suitable to form a component of this invention.

Figure 15 is a view in elevation of this needle taken from the left hand side of Figure 14.

Figure 16 is an enlarged axial section of the point portion of the needle.

Figure 17 is a still larger section on the line 17—17 of Figure 16.

Figure 18 is a view, partly in section, and showing certain steps in suturing a wound with this invention.

Figure 19 is a view similar to Figure 18 but showing a further step in the operation.

In the embodiment of the invention disclosed in the accompanying drawings there is provided a forceps having a pair of arms 10 and 11 offset at their forward ends to cross each other and form cooperating noses 12 and 13. These arms are pivotally connected by a screw 13' and are provided at their rear ends with thumb and finger loops 14.

Located on the arm 11 is a bobbin holder indicated in general at 15. At its forward end this bobbin holder has a cylindrical recess 16 of proper size to hold the bobbin which is of the usual form having end plates 17 connected by a hollow barrel 18. Secured to or projecting from this barrel 18 is a suture clip 19 having an offset end spaced from the body of the barrel so as to grip the end portion of a suture in the operation of winding the bobbin. The coil of suture which is wound on the barrel is shown at 20 and, from this coil, the suture extends as at 21 to pass through a slot 22 in the forward part of the bobbin holder. Projecting laterally from the holder is a pair of vertically spaced lugs 23 supporting a pivot pin 24 whereon is pivoted an arcuate brake arm 25. This brake arm extends around the bobbin holder and is provided at its forward end with a head 26 which lies in front of and crosses the slot 22 so that a portion 27 of the suture may be gripped between the head 26 and the outer face of the holder.

The holder is provided with a rearwardly extending lug portion 28 and the arm 25 extends rearwardly as at 29 to provide a finger engageable head 30 which lies parallel and in slightly spaced relation to the lug 28. Extending transversely of the lug 28 is a bore 31 which is alined with the head 30 and has the end remote from said head normally closed by a removable screw 32. In the bore 31 is seated a coiled compression spring 33 which bears at one end on the screw 32 and at its other end against the head 30 so that the brake head 26 is pressed towards the bobbin holder 15 and normally grips the portion 27 of the suture thus resisting pull on the suture and the unwinding of the bobbin. By exerting finger pressure on the head 30 against the action of the spring 33 the brake arm 25 will be biassed in such manner as to move the brake head 26 away from the holder 15 thus releasing the braking effect on the suture to permit desired unwinding of the bobbin.

A cover 34 normally closes the recess 16, the cover being pivoted at 35 to the lug 28. Any suitable means, such as the downwardly struck depression 36 operating in conjunction with a corresponding dent (not shown) in the rim of the holder, may be used to hold the cover against accidental opening. While the cover normally holds the bobbin in the holder it may be swung to open the holder for insertion or changing of bobbins.

Extending forwardly, as at 37, from the brake head 26 the suture passes to and downwardly through the opening 38 formed in the arm 11. This opening is formed, as seen in Figure 8, with a rearwardly curved upper lip 39 and a forwardly curved lower lip 40 so as to lead the suture smoothly through the hole 38 and permit it to pass forwardly, as at 41, close against the arm 11. In the nose or jaw 12 is a hole 42 having both the upper and lower lips curved rearwardly as at 43 so that the suture will pass smoothly and freely through this hole and up as at 44.

A needle 45 is used in this invention. This needle may be of any desired size or curvature and is gripped, in use, firmly between the jaws 12 and 13, the usual forceps latching means 46 being provided at the rear portion of the device. The needle is provided on the convex side of its curvature with a suture receiving groove 47 which extends to an opening or eye 48 located well toward but spaced from the point of the needle. The part 44 of the suture lies in this groove and the suture then extends through the eye 48 and terminates in an end portion 49 which, when the instrument is not in use, is held by a clip 50 fixed on the side of the arm 11 but which is allowed to fly free when a suturing operation is effected. By being held in the clip 50 the suture, from the point where it leaves the brake head to the clip, is held taut so that the part 41 will not readily catch an obstruction when the device is laid down in its normal position with the bobbin holder 15 uppermost. Consequently the use of the clip 50 prevents accidental unthreading of the needle. It is to be noted that the needle may be held in any desired position in the jaws so that the instrument may be used equally well by a left-handed person as by one who is right-handed.

Fixed to the side of the member or arm 11 is a suture cutter which has a stem 51 terming in a transverse head 52 provided with recurved arms 53, knife edges 54 being formed at the concave edges of these arms. By means of this T-headed cutter the suture may be cut by either a right-handed or a left-handed person with equal facility.

Figures 18 and 19 show typical steps in suturing a wound with this instrument. In Figure 18 there is shown the passing of the needle through the lips of a wound or cut W. As the point of the needle projects in the manner shown a part of the suture portion extends like a bow string from the exit of the needle from the flesh to the eye 48 as in the full line showing, the extremity of the part 49 not having entered the flesh. The bow string part is then grasped by a tweezers F, forceps or even by the fingers and pulled through as indicated by the dotted lines. At the same time the brake is released and the needle backed out as shown in Figure 19. The brake is kept off until sufficient suture has been drawn through the eye to enable the suture to reach the cutter whereupon the brake is allowed to be applied and the suture cut by entry into a convenient side of the cutter.

While open wounds not capable of being spanned by the needle may be sutured by inserting the needle through one lip of the wound, releasing the needle from the forceps and regripping it at a place where it has been projected through the lip and drawing it entirely through this lip. Again releasing the needle and regripping it by its base portion and operating on the other lip similar to the manner shown in Figure 18.

Various other operative procedures will occur to the experienced surgeon but it is not necessary here to go into all possible procedures since the examples shown and described clearly demonstrate the utility of the instrument.

What is claimed as new, is:

1. In combination, a pair of forceps having a pair of crossing arms each provided at one end with a jaw to receive a suture needle and at its other end with handle means, a suture bobbin rotatably supported on one of said arms, a brake mechanism finger operatable from the handle ends of said arms, and suture guiding means on one of said arms and one of said jaws for guiding a suture from the brake means to the needle eye.

2. In combination, a pair of forceps having a pair of crossing arms each provided at one end with a jaw and at its other end with handle means, a suture bobbin rotatably supported on one of said arms, a brake mechanism finger operatable from the handle ends of said arms, a pointed suturing needle gripped between said jaws and having an eye adjacent its point, and suture clipping means on one of the arms for engaging the end of a suture and holding it taut from the brake mechanism to said clipping means.

3. In combination, a pair of forceps having a pair of pivotally connected crossing arms each provided at one end with a jaw to receive a suture needle and at its other end with handle means, a bobbin holder on one of said arms and having at its forward end a cylindrical bobbin receiving recess, the wall of said recess being provided with a suture passage, a bobbin rotatably held in said recess for carrying a coil of suture, a brake mechanism operable from the handle ends of said arms and engaging the suture after it leaves said passage, and suture guiding means on one of said arms and one of said jaws for guiding a suture from the brake means to the needle eye.

4. In combination, a pair of forceps having a pair of pivotally connected crossing arms each provided at one end with a jaw and at its other end with handle means, a bobbin holder on one of said arms and having at its forward end a cylindrical bobbin receiving recess, the wall of said recess being provided with a suture passage, a bobbin rotatably held in said recess for carrying a coil of suture, a brake mechanism operable from the handle ends of said arms and engaging the suture after it leaves said passage, a pointed suturing needle gripped in said jaws and having an eye adjacent its point, and suture clipping means on one of said arms for engaging the end of a suture and hold it taut from the braking mechanism.

5. In combination, a pair of forceps having a pair of crossing arms pivotally connected and each provided at one end with a jaw and at the other end with handle means, a suture bobbin rotatably supported on one of said arms, a brake mechanism positioned to engage a suture wound on said bobbin and extending therefrom, and spring means urging said brake mechanism into braking position, said braking mechanism being finger operable from the handle means end of the arms for release against the action of said spring means.

6. In combination, a pair of forceps having a pair of pivotally connected crossing arms each having a jaw at one end and finger loop at the other, a suture bobbin holder on one of said arms and having a cylindrical recess for receiving a bobbin, said holder having a suture passage in its wall, a suture bobbin revolubly mounted in said recess and having suture wound thereon and extending through said passage, a brake arm pivoted at the side of said holder and having a brake head adapted to press a portion of the suture extending from the passage, and spring means effecting braking movement of said head, said brake arm having a rearward extension adapted for engagement by a finger of a hand having other fingers engaged in said loops.

7. In combination, a pair of forceps having a pair of pivotally connected crossing arms each having a jaw at one end and finger loop at the other, a suture bobbin holder on one of said arms and having a cylindrical recess for receiving a bobbin, said holder having a suture passage in its wall, a suture bobbin revolubly mounted in said recess and having suture wound thereon and extending through said passage, a brake arm pivoted at the side of said holder and having a brake head adapted to press a portion of the suture extending from the passage, and a suturing needle gripped by said jaws, said needle having a point and being provided with an eye adjacent said point to receive the suture extending beyond the brake head.

8. In combination, a pair of forceps having a pair of pivotally connected crossing arms each having a jaw at one end and finger loop at the other, a suture bobbin holder on one of said arms and having a cylindrical recess for receiving a bobbin, said holder having a suture passage in its wall, a suture bobbin revolubly mounted in said recess and having suture wound thereon and extending through said passage, a brake arm pivoted at the side of said holder and having a brake head adapted to press a portion of the suture extending from the passage, a pointed suturing needle gripped between said jaws and having an eye adjacent the point for receiving suture leading from the brake head, and guide means associated with said forceps for holding the suture close to the forceps in its passage from the brake head to the needle.

9. In combination, a pair of forceps having a pair of pivotally connected crossing arms each having a jaw at one end and finger loop at the other, a suture bobbin holder on one of said arms and having a cylindrical recess for receiving a bobbin, said holder having a suture passage in its wall, a suture bobbin revolubly mounted in said recess and having suture wound thereon and extending through said passage, a brake arm pivoted at the side of said holder and having a brake head adapted to press a portion of the suture extending from the passage, a pointed suturing needle gripped between said jaws and having an eye adjacent the point for receiving suture leading from the brake head, and suture clipping means on one of the arms for engaging the free end portion of the suture after passing through the eye.

10. A suture cutter for suturing forceps having arms and consisting of a stem extending laterally from one of said arms, a T-head on said stem having ends curved backwardly toward the arm carrying said stem, and knife edges.

HERBERT H. OGBURN.